(12) United States Patent
Song

(10) Patent No.: US 9,047,055 B2
(45) Date of Patent: Jun. 2, 2015

(54) FOLDABLE FLEXIBLE DISPLAY DEVICE

(71) Applicant: PREXCO CO., LTD., Seongdong-myeon, Nonsan-si (KR)

(72) Inventor: In-Sung Song, Siheung-si (KR)

(73) Assignee: PREXCO CO., LTD. (KR)

( * ) Notice: Subject to any disclaimer, the term of this patent is extended or adjusted under 35 U.S.C. 154(b) by 1 day.

(21) Appl. No.: 13/917,279

(22) Filed: Jun. 13, 2013

(65) Prior Publication Data

US 2014/0196254 A1 Jul. 17, 2014

(30) Foreign Application Priority Data

Jan. 11, 2013 (KR) .................. 10-2013-0003350

(51) Int. Cl.
| | |
|---|---|
| *G06F 1/16* | (2006.01) |
| *E05D 3/16* | (2006.01) |
| *E05D 3/14* | (2006.01) |
| *E05D 3/06* | (2006.01) |

(52) U.S. Cl.
CPC .............. *G06F 1/1652* (2013.01); *Y10T 16/52* (2013.01); *Y10T 16/53864* (2013.01); *Y10T 16/547* (2013.01); *Y10T 16/525* (2013.01); *G06F 1/1618* (2013.01); *G06F 1/162* (2013.01); *E05D 3/14* (2013.01); *Y10T 16/5476* (2013.01); *Y10T 16/5475* (2013.01); *E05D 3/06* (2013.01); *E05D 2003/163* (2013.01); *E05D 3/16* (2013.01); *G06F 1/1681* (2013.01)

(58) Field of Classification Search
CPC .............. E05D 3/06; E05D 3/14; E05D 3/15; E05D 2003/163; E05D 3/16; G06F 1/1681; G06F 1/1618; G06F 1/162; Y10T 16/525; Y10T 16/5253; Y10T 16/5257; Y10T 16/53864; Y10T 16/5387; Y10T 16/5388; Y10T 16/547; Y10T 16/5474; Y10T 16/5475; Y10T 16/5476; Y10T 16/5478; Y10T 16/546
USPC .......... 16/225–227, 302, 303, 304, 366, 368, 16/369, 370, 371; 361/679.27, 679.04, 361/679.06, 679.07, 679.1, 679.18–679.2, 361/679.28; 455/575.3; 379/433.11, 433.13
See application file for complete search history.

(56) References Cited

U.S. PATENT DOCUMENTS

| | | | | |
|---|---|---|---|---|
| 2,200,142 | A | * | 5/1940 | Witschi ......................... 16/369 |
| 4,995,144 | A | * | 2/1991 | Gateley .......................... 16/261 |

(Continued)

FOREIGN PATENT DOCUMENTS

| | | |
|---|---|---|
| KR | 1020100112383 A | 10/2010 |
| KR | 1020110100936 A | 9/2011 |

(Continued)

*Primary Examiner* — Jeffrey O Brien
(74) *Attorney, Agent, or Firm* — R. Neil Sudol; Henry D. Coleman

(57) ABSTRACT

The present invention provides a foldable flexible display device. A foldable flexible display device according to the present invention includes: first and second plates having a predetermined area; a hinge member for connecting the first plate and the second plate; and a flexible display screen attached to the tops of the first plate and the second plate and the hinge member, in which the hinge member folds the first plate and the second plate and the flexible display screen while folding with smooth curvature. According to this configuration, the operation for folding or unfolding the screen of a flexible display device can be smoothly operated and damage to the display screen can be prevented, resulting in remarkable improvement in reliability of a product.

5 Claims, 17 Drawing Sheets

(56) References Cited

U.S. PATENT DOCUMENTS

| | | | |
|---|---|---|---|
| 5,148,850 A * | 9/1992 | Urbanick | 160/231.1 |
| 6,055,705 A * | 5/2000 | Komatsu et al. | 16/225 |
| 7,082,196 B2 * | 7/2006 | Kauhaniemi et al. | 379/447 |
| 7,082,318 B2 * | 7/2006 | Wilson | 455/550.1 |
| 7,251,323 B2 * | 7/2007 | Holtorf et al. | 379/433.13 |
| 7,328,481 B2 * | 2/2008 | Barnett | 16/227 |
| 8,091,178 B2 * | 1/2012 | Degner et al. | 16/285 |
| 8,125,759 B2 * | 2/2012 | Fukuma et al. | 361/260 |
| 8,151,501 B2 * | 4/2012 | Bemelmans et al. | 40/610 |
| 8,713,759 B2 * | 5/2014 | Cai | 16/366 |
| 8,813,312 B2 * | 8/2014 | Song et al. | 16/370 |
| 2005/0055807 A1 * | 3/2005 | Maatta et al. | 16/366 |
| 2007/0107600 A1 | 5/2007 | Yoshitake | |
| 2010/0232100 A1 * | 9/2010 | Fukuma et al. | 361/679.01 |
| 2012/0110784 A1 * | 5/2012 | Hsu et al. | 16/226 |
| 2012/0120618 A1 * | 5/2012 | Bohn | 361/749 |
| 2012/0147542 A1 * | 6/2012 | Kim | 361/679.28 |
| 2013/0219663 A1 * | 8/2013 | Cai | 16/371 |
| 2013/0318746 A1 * | 12/2013 | Kuramochi | 16/342 |
| 2014/0007376 A1 * | 1/2014 | Brewer et al. | 16/225 |
| 2014/0007377 A1 * | 1/2014 | Masini et al. | 16/225 |

FOREIGN PATENT DOCUMENTS

| | | | |
|---|---|---|---|
| KR | 1020130073331 A | 7/2013 | |
| WO | WO 2008054206 A2 * | 5/2008 | G06F 1/16 |

* cited by examiner

FOLDABLE FLEXIBLE DISPLAY DEVICE

CROSS-REFERENCE TO RELATED APPLICATION

This application is based on and claims priority from Korean Patent Application No. 10-2013-0003350, filed on Jan. 11, 2013 in the Korean Intellectual Property Office, the disclosure of which is incorporated herein in its entirety by reference.

BACKGROUND OF THE INVENTION

1. Field of the Invention

The present invention relates to a foldable flexible display device, and more particularly, to a foldable flexible display device that can be folded/unfolded at a folding portion of the flexible display device allowing portable terminals such as a tablet PC with a foldable front, which is a display screen, to be flexible and foldable and that can be safely folded by preventing damage to the display due to excessive folding.

2. Description of the Related Art

In general, portable terminals, such as a smartphone and a tablet PC that can access the internet by improving mobile phones, are greatly popular in recent years in debt to developments in the communication technology and the semiconductor and optical technologies and it changes all the life environments of human and brings remarkable renovation to a science technology.

In particular, the tablet PC has a wide display screen but a large volume and thus is inconvenient to be carried.

As an alternative for this inconvenience, a flexible display having flexibility has been proposed.

As a conventional art relating to the flexible display substrate that is foldable/unfoldable, [Flexible display substrate] has been disclosed in Korean Patent Application No. 10-2009-0030869.

The flexible display means a display that can be rolled, or curved or bent like paper, and freely designed at its outer wall.

Further, the flexible display may be understood as a strong display without breaking since the substrate has flexibility and may be understood as a thin & light display by using a thin and light substrate such as plastic in some cases.

The most basic type would be the flexible display that can be carried with the volume reduced to a half by folding it into a half.

Even in this foldable type, it is preferable that the flexible display cannot be bent and folded like paper to be folded but can be folded with smooth curvature.

SUMMARY OF THE INVENTION

An object of the present invention is to provide a foldable flexible display device that can be folded/unfolded at a folding portion of flexible display device allowing a tablet PC with a front, which is a display, to be flexible and foldable and that can be safely folded with smooth curvature to prevent damage to the display screen due to excessive folding According to an aspect of the present invention, a flexible display device may include: first and second plates each having a predetermined area; a hinge member for connecting the first plate and the second plate for connecting the first plate and the second plate; and a flexible display screen attached to the tops of the first plate and the second plate and the hinge member, wherein the hinge member folds the first plate and the second plate and the flexible display screen while it is folded with smooth curvature.

The hinge member may include: a plurality of link assemblies pivotably combined with the first plate and the second plate and arranged to be bendable together; link pins connecting the link assemblies; and a first leaf spring that surrounds the outer side of the hinge member, with one end connected to the first plate and the other end connected to the second plate, and has elasticity.

The hinge member may include: a plurality of link assemblies pivotably combined with the first plate and the second plate and arranged to be bendable together; and link pins connecting the link assemblies, in which the link assembly and the link pin may be provided with magnetic substances having the same polarity on the contact surfaces and accordingly rotated by the repulsive force of the magnetic substances.

A first magnetic substance may be disposed at the link assembly, a second magnetic substance may be disposed at a coupling portion formed at one end of the second plate to correspond to the first magnetic substance, and the first and second magnetic substances may have the same polarity.

A third magnetic substance may be embedded in one side of a first coupling portion of the link pin, a fourth magnetic substance may be embedded in one side of a coupling portion of the link assembly to correspond to the third magnetic substance, and the third and fourth magnetic substances may have the same polarity.

The hinge member may include: a plurality of link assemblies pivotably combined with the first plate and the second plate and arranged to be bendable together; link pins connecting the link assemblies; and a soft plate member that is attached to the inner side of the hinge member, mounted on the inner sides of the first and second plates, and helps folding by being selectively attached, by a magnetic force, to first and second magnets spaced from each other on the first plate, with the folding of the first and second plates.

The soft plate member may be a soft plate and a third magnet that is selectively attached to the first and second magnets may be disposed at a side on the underside of the soft plate member.

At least one or more guide grooves having a predetermined length may be formed at one side of the soft plate member and shaft pins of the hinge member may be inserted in the guide grooves.

A guide groove may be formed on the first plate so that the third magnet of the soft plate member is inserted therein and longitudinally moved, a first magnet may be disposed at a side in the guide groove, and a second magnet may be disposed at the other end at a predetermined distance from the first magnet.

The hinge member may include: a plurality of link assemblies pivotably combined with the first plate and the second plate and arranged to be bendable together; and link pins connecting the link assemblies, in which a fixing mechanism generating a fixing force by spring elasticity may be disposed on the contact surfaces of the link assembly and the link pin so that a folding or unfolding angle can be adjusted by a fixing force generated by the fixing mechanism.

The fixing mechanism may include: balls protruded at one side of the link assembly by elasticity of springs; and a plurality of fixing grooves formed one surface of the link pin to correspond to the balls.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

DETAILED DESCRIPTION OF THE PREFERRED EMBODIMENTS

Hereinafter, exemplary embodiments of the present invention are described in detail with reference to the accompanying drawings.

A foldable flexible display device according to the present invention includes first and second plates 100 and 200 each having a predetermined area, a hinge member A1 for connecting the first plate 100 and the second plate 200, and a flexible display screen attached to the tops of the first plate 100 and the second plate 200 and the hinge member A1.

The hinge member A1, provided for folding the first plate 100 and the second plate 200, generally bends not to be folded to prevent damage to a flexible display substrate, but to be folded with smooth curvature.

Various examples of the hinge members A1~A4 according to the present invention will be described in detail hereafter.

First Embodiment

Figure 1:
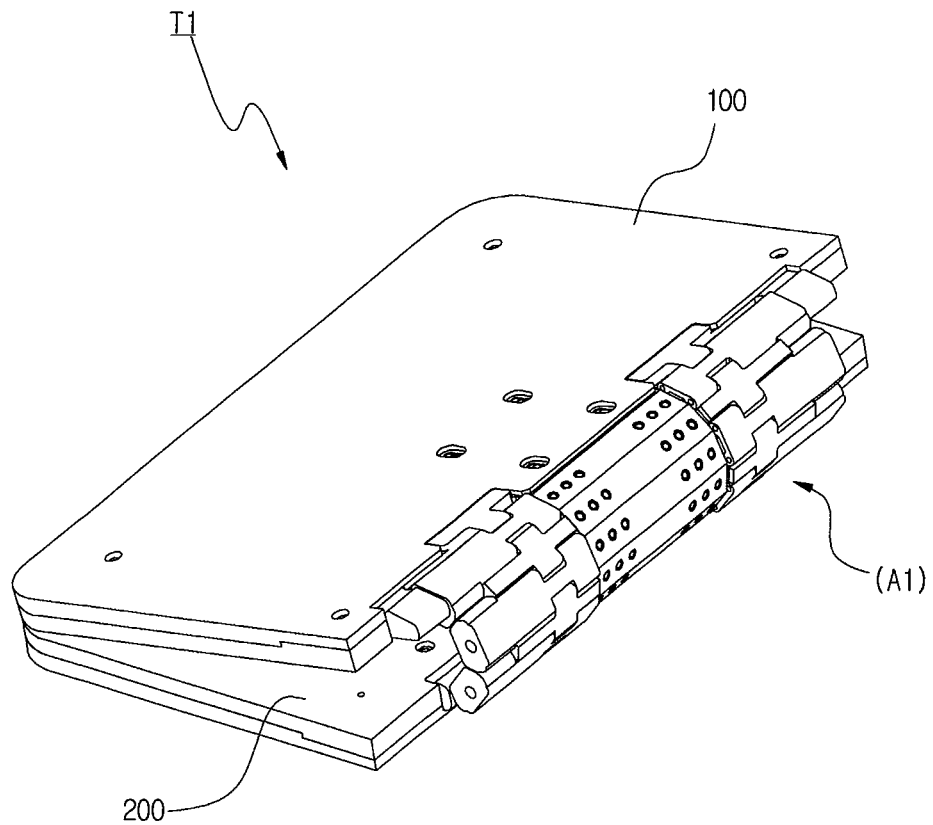
FIG. 1 is a perspective view showing when a foldable flexible display device according to a first embodiment of the present invention is folded.
Figure 2:
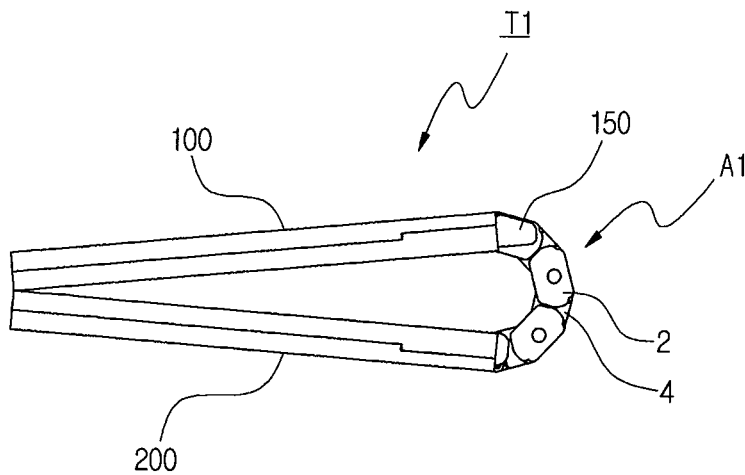
FIG. 2 is a front view showing when the foldable flexible display device according to the first embodiment of the present invention is folded.
Figure 3:
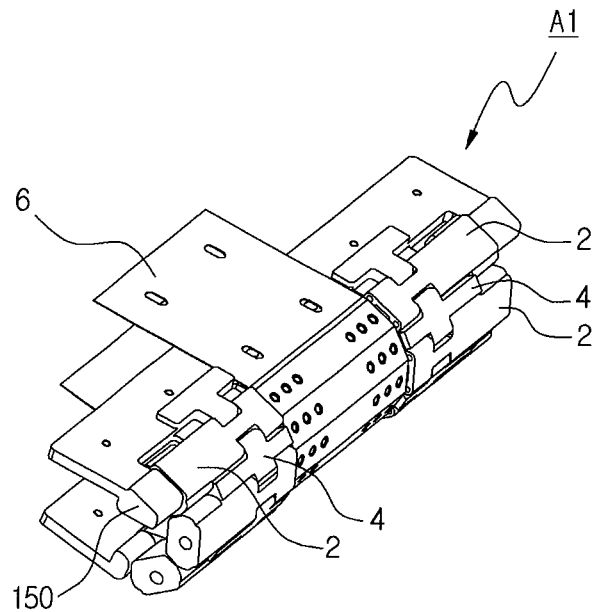
FIG. 3 is a perspective view showing a hinge member in FIG. 1.
Figure 4:
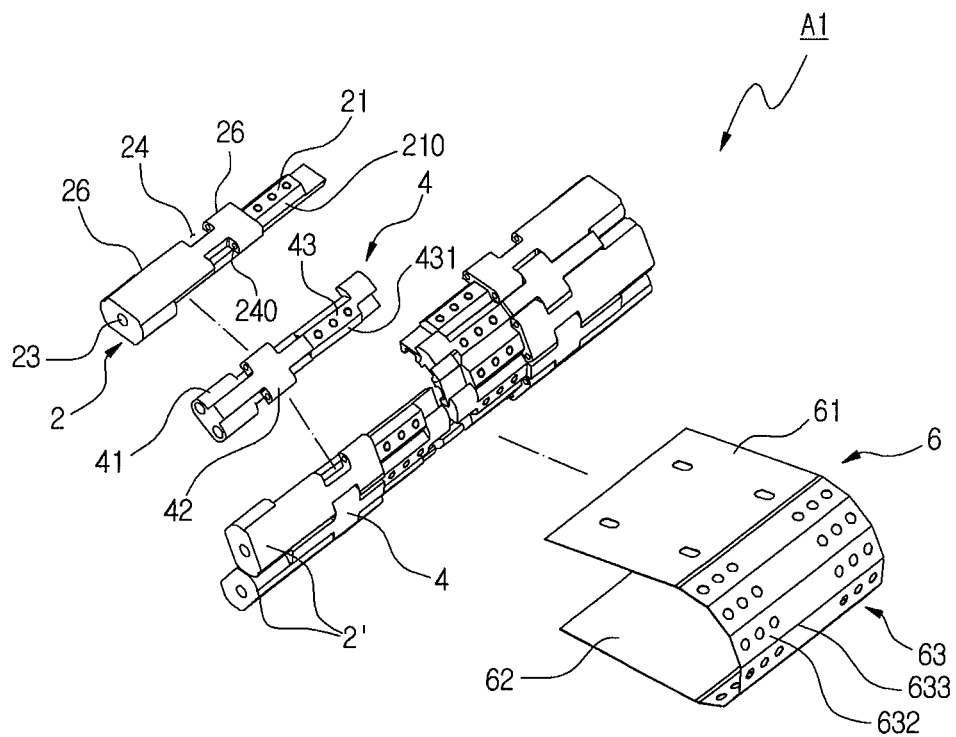
FIG. 4 is an exploded perspective view of the hinge member in FIG. 3.
Figure 5:
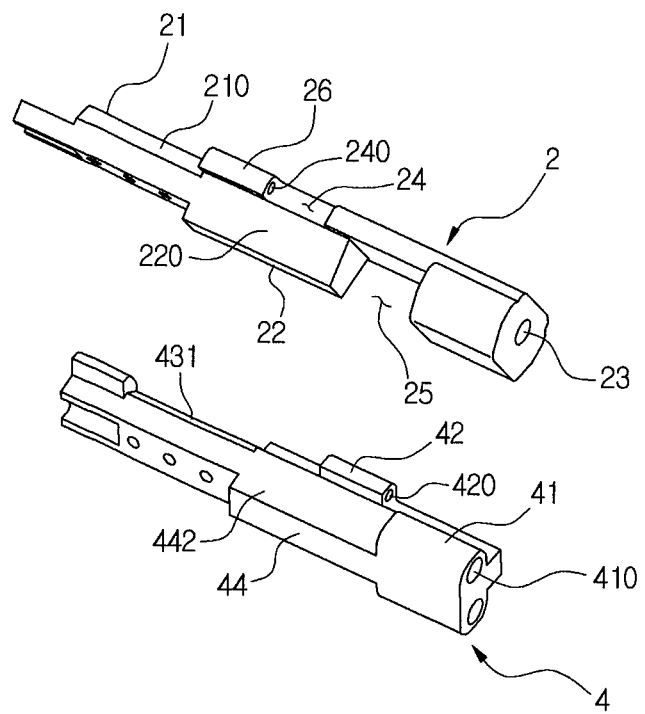
FIG. 5 is a bottom perspective view of a link assembly and a link pin in FIG. 4.

In the accompanying drawings, FIG. 1 is a perspective view showing when a foldable flexible display device according to a first embodiment of the present invention is folded, FIG. 2 is a front view showing when the foldable flexible display device according to the first embodiment of the present invention is folded, FIG. 3 is a perspective view showing a hinge member in FIG. 1, FIG. 4 is an exploded perspective view of the hinge member in FIG. 3, and FIG. 5 is a bottom perspective view of a link assembly and a link pin in FIG. 4.

As shown in FIGS. 1 to 5, a foldable flexible display device T1 according to the first embodiment of the present invention includes: first and second plates 100 and 200 each having a predetermined area; a hinge member A1 for connecting the first plate 100 and the second plate 200; and a flexible display screen (not shown) attached to the tops of the first plate 100 and the second plate 200 and the hinge member A1.

The hinge member A1 includes: a plurality of link assemblies 2 pivotably combined with the first plate 100 and the second plate 200 and arranged to be bendable together; and link pins 4 connecting the link assemblies 2, and further includes a first leaf spring 6 that surrounds the outer side of the hinge member A1, with one end connected to the first plate 100 and the other end connected to the second plate 200, and has elasticity.

The link assembly 2 has a first through-hole 23 at one end, which is coupled to a coupling portion 150 formed at one end of each of the first plate 100 and the second plate 200 by a shaft pin and a coupling groove 25 at the bottom in which a first coupling portion 41 of a link pin 4 is inserted.

Further, a groove 24 is formed at a side on one side of the link assembly, to which the link pin 4 is fitted, and a second through-hole 240 to which a pin is fitted is formed at a step 26 protruding at both sides of the groove 24.

The link assembly 2 has a first inclined portion 210 at both sides on the other side which restricts excessive outward rotation when the link pin 4 is rotated outward, in close contact with the side of the link pin 4, and has a first upper step 21 at the top which is fastened to the first leaf spring 6.

The 'outward' means a direction opposite to the direction of folding and the 'excessive outward rotation' means that the first plate 100 and the second plate 200 rotate outward over the horizontally folding position.

A first lower step 22 with a second inclined portion 220 at both sides, which restricts excessive inward rotation when the link pin 4 rotates inward, is formed on the bottom of the link assembly 2.

The first upper step 21 and the first lower step 22 have a substantially trapezoidal cross-section and the first inclined portion 210 and the second inclined portion 220 are formed to be opposite to each other at both sides, respectively.

The link pin 4, which is provided for connecting two link assemblies 2 and 2' and guides them in rotation, has a first coupling portion 41 at a side which is inserted in the coupling grooves 25 of the link assemblies 2 and 2' and has a protrusion 42 at both sides which is inserted in the groove 24 of the link assembly 2 and fixed by pins.

Third through-hole 420 to which a pin is fitted is formed at the protrusion 42.

The link pin 4 has a second upper step 43 at a side on the top where a third inclined portion 431 being in contact with the first inclined portion 210 of the first upper step 21 of the link assembly 2 is formed, and has a second lower step 44 where a fourth inclined portion 442 being in contact with the first lower step 22 of the link assembly 2 is formed.

The second upper step 43 and the second lower step 44 have a substantially trapezoidal cross-section and the third inclined portion 431 and the fourth inclined portion 442 are formed to be opposite to each other at both sides, respectively.

The first leaf spring 6 has first and second plate portions 61 and 62 connected with the first plate 100 and the second plate 200, respectively, and a curved portion 63 connected to the first and second plate portions 61 and 62 and mounted on the outer side of the hinge member A1.

The curved portion 63 is formed by connecting a plurality of mounting surfaces 632 mounted on the link assembly 2 and the link pin 4 of the hinge member A1, respectively, and each of which has a folding portion 633 formed in the width direction for easy bending.

The curved portion 63 is mounted and fixed, for example, by welding or bolting the mounting surfaces 632 to the first upper step 21 of the link assembly 2 and the second upper step 43 of the link pin 4 which correspond to the mounting surfaces, respectively.

The operation of the first embodiment T1 of the present invention having this configuration will be described hereafter.

As shown in FIG. 1, when the flexible display device according to the present invention is folded, the hinge member A1 is rolled to form a circle.

That is, even though it is folded, the portion where the hinge member A1 is disposed has smooth curvature, and accordingly, a curved line is made such that excessive deformation such as bending of the flexible display screen is not caused.

When stress is generated while the first leaf spring 6 is bent and a force that closes the first plate 100 and the second plate 200 is removed, the plates can be naturally unfolded by a restoring force of the leaf spring 6.

Second Embodiment

Figure 6:
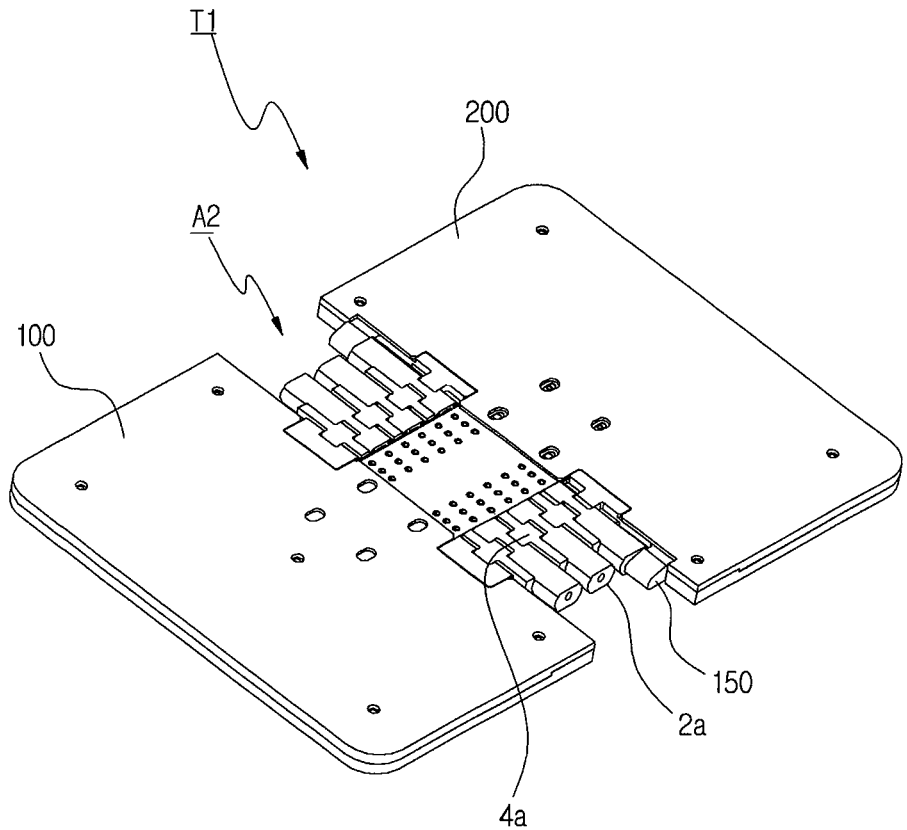
FIG. 6 is a perspective view showing the rear of the foldable flexible display device according to a second embodiment of the present invention when it is unfolded.
Figure 7:
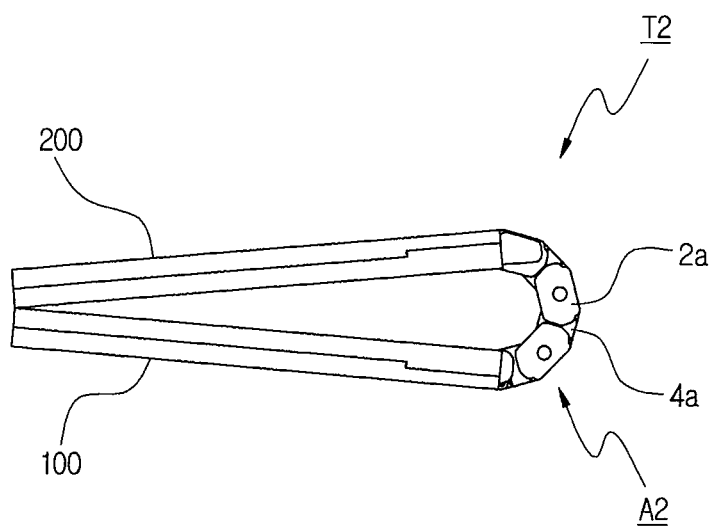
FIG. 7 is a front view showing when the foldable flexible display device according to the second embodiment of the present invention is folded.
Figure 8:
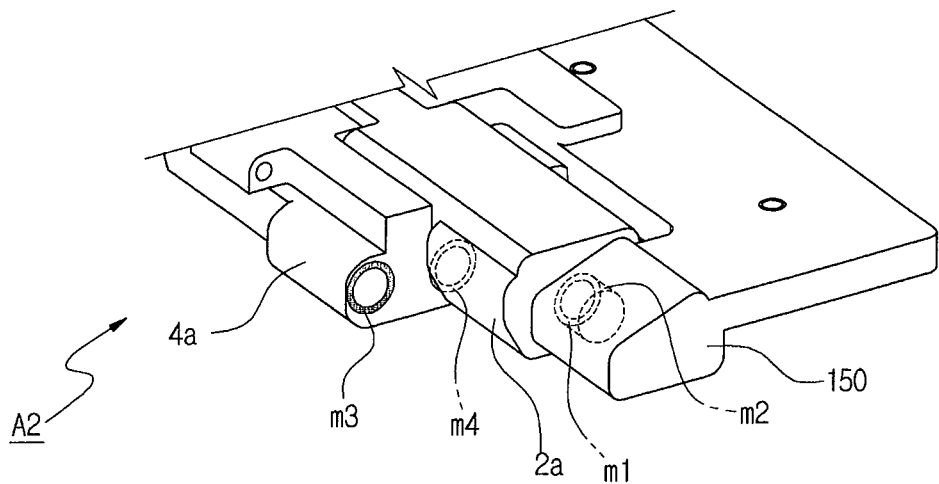
FIG. 8 is an enlarged perspective view showing a hinge member in FIG. 6.
Figure 9:
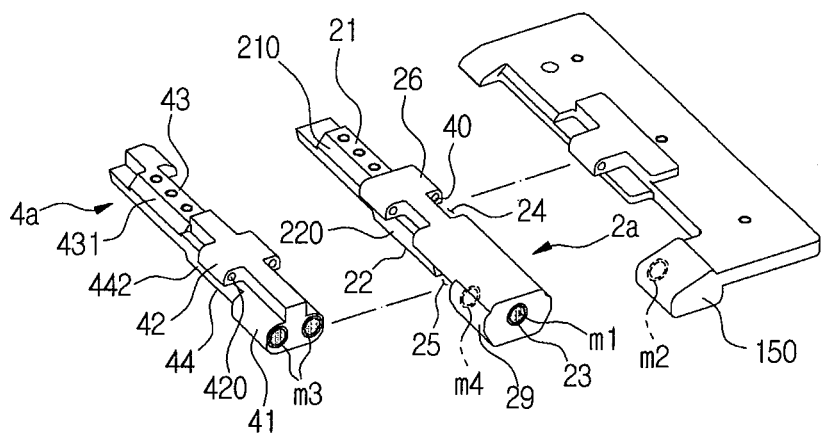
FIG. 9 is an exploded perspective view of the hinge member in FIG. 7.
Figure 10:
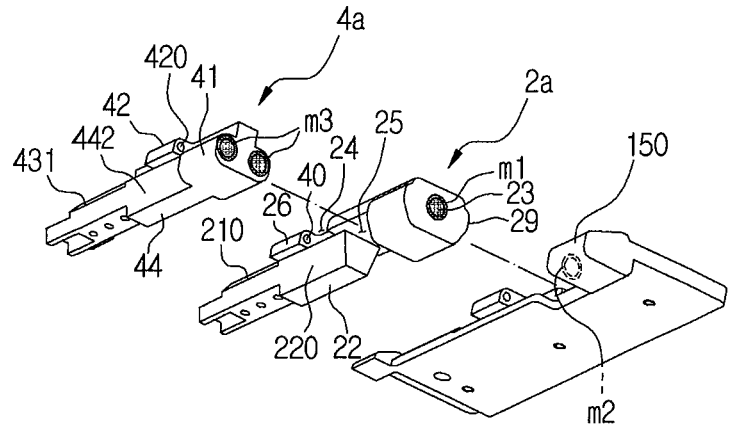
FIG. 10 is a bottom perspective view of a link assembly and a link pin in FIG. 9.
Figure 11:
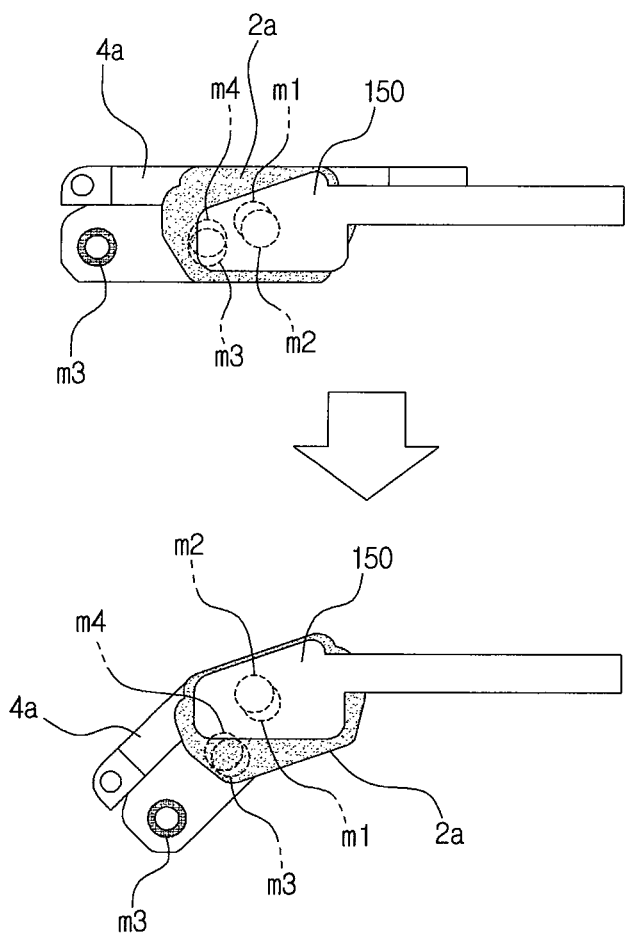
FIG. 11 is a front view showing the operation of the hinge member in FIG. 7.

In the accompanying drawings, FIG. 6 is a perspective view showing the rear of the foldable flexible display device according to a second embodiment of the present invention when it is unfolded, FIG. 7 is a front view showing when the foldable flexible display device according to the second embodiment of the present invention is folded, FIG. 8 is an enlarged perspective view showing a hinge member in FIG. 6, FIG. 9 is an exploded perspective view of the hinge member in FIG. 7, FIG. 10 is a bottom perspective view of a link assembly and a link pin in FIG. 9, and FIG. 11 is a front view showing the operation of the hinge member in FIG. 7.

As shown in FIGS. 6 to 11, a foldable flexible display device T2 according to the second embodiment of the present invention includes: first and second plates 100 and 200 each having a predetermined area; a hinge member A2 for connecting the first plate 100 and the second plate 200; and a flexible display screen attached to the tops of the first plate 100 and the second plate 200 and the hinge member A2.

The hinge member A2, provided to guide folding of the first plate 100 and the second plate 200, generally guides the plates not to be angled but to be folded with smooth curvature to prevent damage to a flexible display substrate.

The hinge member A2 includes: a plurality of link assemblies 2a pivotably combined with the first plate 100 and the second plate 200 and arranged to be bendable together; and link pins 4 disposed between the link assemblies 2 to connect them, in which the link assembly 2a and the link pin 4a are provided with magnetic substances having the same polarity on the contact surfaces and accordingly rotated by the repulsive force of the magnetic substances.

The link assembly 2a has a rotating portion 29 at one side where a first through-hole 23, which is coupled to a coupling portion 150 formed at one end of each of the first plate 100 and the second plate 200 by a shaft pin, is formed and a coupling groove 25 at the bottom in which a first coupling portion 41 of a link pin 4a is inserted.

Further, a groove 24 is formed at a side of the link assembly, to which a protrusion 42 of the link pin 4a is fitted and a second through-hole 240 to which a pin is fitted is formed at a step 26 protruding at both sides of the groove 24.

The link assembly 2a has a first inclined portion 210 at both sides on the other side which restricts excessive outward rotation when the link pin 4a is rotated outward, in close contact with the side of the link pin 4a, and has a first upper step 21 at the top which is fastened to a leaf spring 6.

A first lower step 22 with a second inclined portion 220 at both sides, which restricts excessive inward rotation of the link pin 4a when it rotates inward, is formed on the bottom of the link assembly 2a.

The first upper step 21 and the first lower step 22 have a substantially trapezoidal cross-section and the first inclined portion 210 and the second inclined portion 220 are formed to be opposite to each other at both sides, respectively.

The link pin 4a, which is provided for connecting two link assemblies 2a and guide them in rotation, has a first coupling portion 41 at a side which is inserted in the coupling grooves 25 of the link assemblies 2a and fixed by pins and has a protrusion 42 at both sides which is inserted in the groove 24 of the link assembly 2a.

Third and fourth through-holes 410 and 420 to which pins are fitted are formed at the first coupling portion 41 and the protrusion 42, respectively.

The link pin 4a has a second upper step 43 at a side on the top where a third inclined portion 431 being in contact with the first inclined portion 210 of the first upper step 21 of the link assembly 2a is formed, and has a second lower step 44 where a fourth inclined portion 442 being in contact with the first lower step 22 of the link assembly 2a is formed.

A first magnetic substance m1 is embedded in a rotating portion 29 of the link assembly 2a, around the first through-hole 23.

A second magnetic substance m2 is embedded in one surface of the coupling portion 150 formed at one end of the second plate 200 to correspond to the first magnetic substance m1.

The first and second magnetic m1 and m2 have the same polarity.

The first magnetic substance m1 and the second magnetic substance m2 are arranged to partially overlap each other.

That is, they are not arranged in the same line, but the second magnetic substance m2 is formed at a position where it can partially overlap the first magnetic substance m1 a little downward or upward.

Therefore, when the link assembly 2a rotates a little and the first magnetic substance m1 meets the second magnetic substance m2, a pushing force is generated by the repulsive force therebetween and the first magnetic substance m1 is pushed to a side, and thus the force acts as a force rotating the link assembly 2a.

Further, a third magnetic substance m3 is embedded in one side of the first coupling portion 41 of the link pin 4a, a fourth magnetic substance m4 is embedded in one side of the coupling groove 25 of the link assembly 2a to correspond to the third magnetic substance, and the third and fourth magnetic substances m3 and m4 have the same polarity.

Accordingly, when the link pin 4a rotates a little, a pushing force is generated by the repulsive force between the third magnetic substance m3 and the fourth magnetic substance m4, and therefore, the link pin 4a can rotate with the rotation of the third magnetic substance m3.

The operation of the second embodiment T2 of the present invention having this configuration will be described hereafter.

As shown in FIG. 7, when the flexible display device T2 according to the present invention is folded, the hinge member A2 is rolled to form a circle.

That is, even though it is folded, the portion where the hinge member A2 is disposed has smooth curvature, and accordingly, a curved line is made such that a deformation is not caused to the flexible display screen.

When the folding is performed, as described above, bending by the link assembly 2a and the link pin 4a can be more smoothly performed by the repulsive force between the first and second magnetic substances m1 and m2 and the third and fourth magnetic substances m3 and m4.

In contrast, as shown in FIG. 6, when the flexible display device T2 according to the present invention is unfolded, the hinge member A is unfolded flat and the leaf spring 6 is fixed to the link assemblies 2a and the link pins 4a; therefore, predetermined linked motion is provided and the unfolded status can be kept flat.

When the unfolding is performed, as described above, unfolding by the link assembly 2a and the link pin 4a can be more smoothly performed by the repulsive force between the first and second magnetic substances m1 and m2 and the third and fourth magnetic substances m3 and m4.

Third Embodiment

Figure 12:
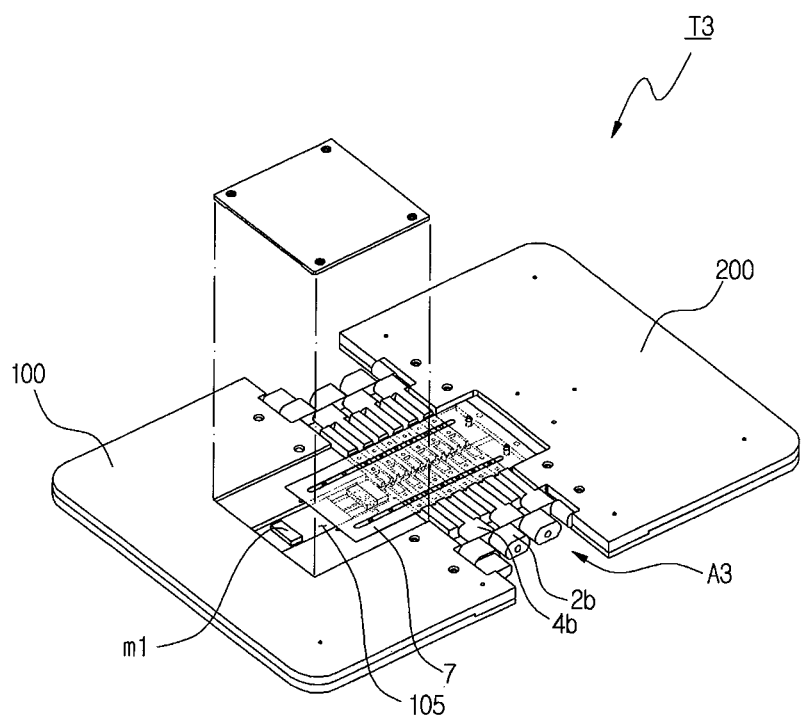
FIG. 12 is a perspective view showing when a foldable flexible display device according to a third embodiment of the present invention is unfolded.
Figure 13:
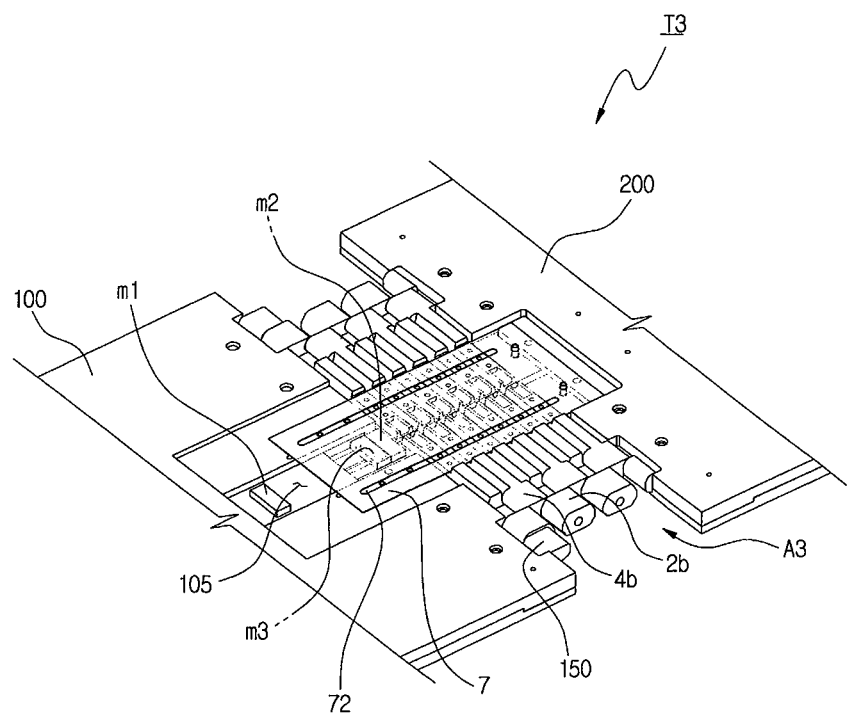
FIG. 13 is an enlarged perspective view showing a hinge member in FIG. 12.
Figure 14:
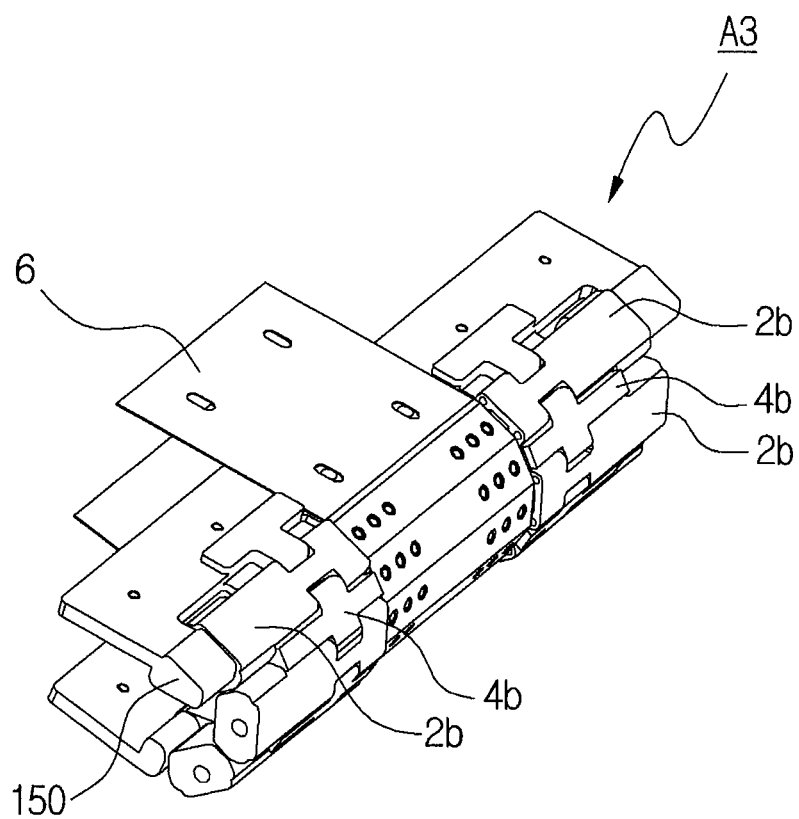
FIG. 14 is a perspective view showing the hinge member in FIG. 12.
Figure 15:
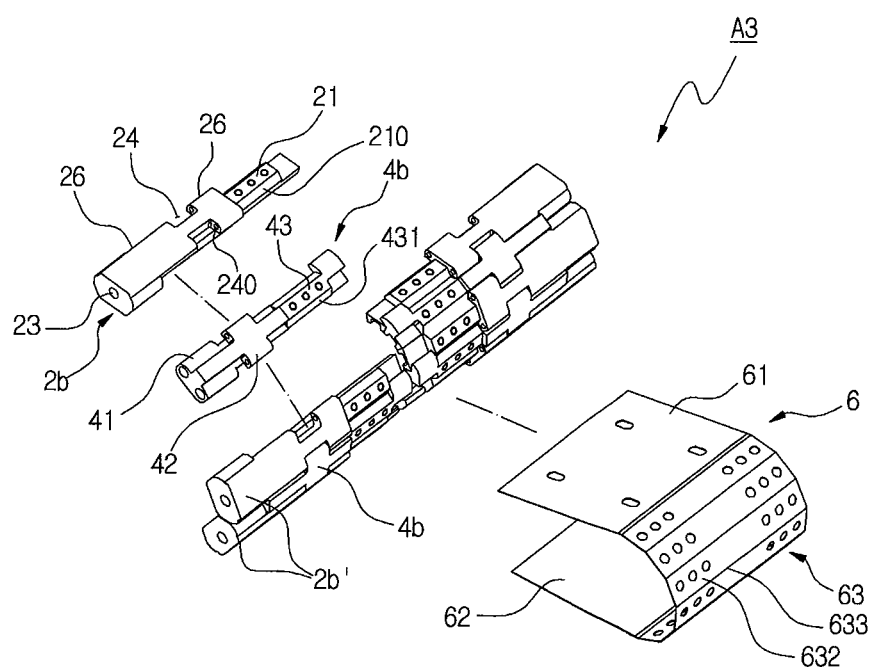
FIG. 15 is an exploded perspective view showing the hinge member in FIG. 14.
Figure 16:
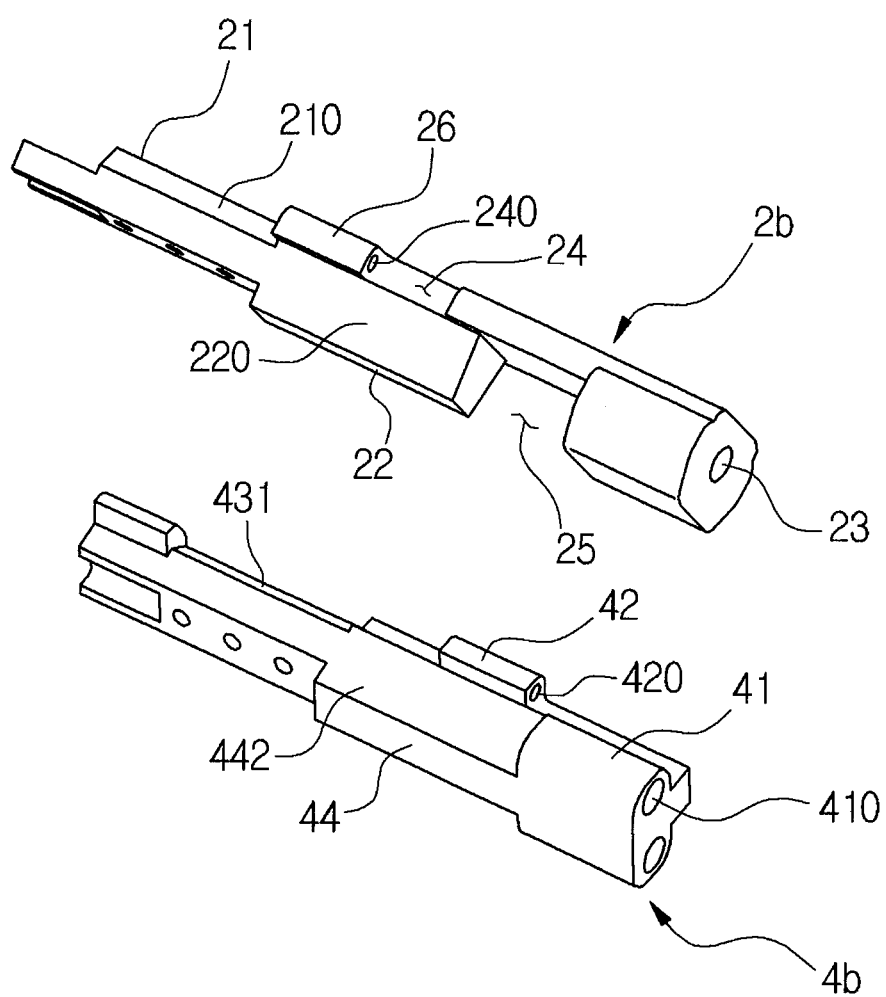
FIG. 16 is a bottom perspective view showing the link assembly and the link pin in FIG. 15.
Figure 17:
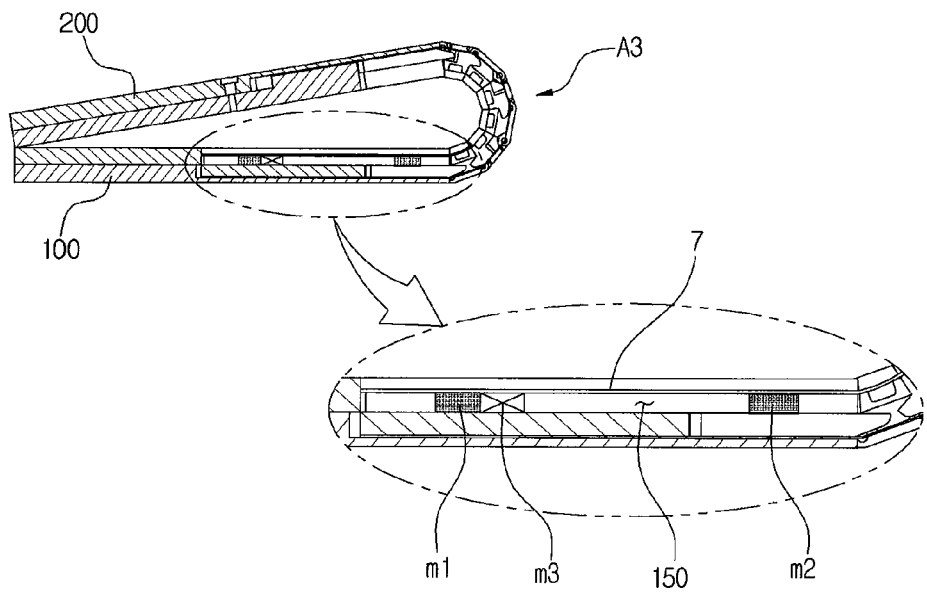
FIG. 17 is a view showing when the foldable flexible display device according to the third embodiment of the present invention is folded.
Figure 18:
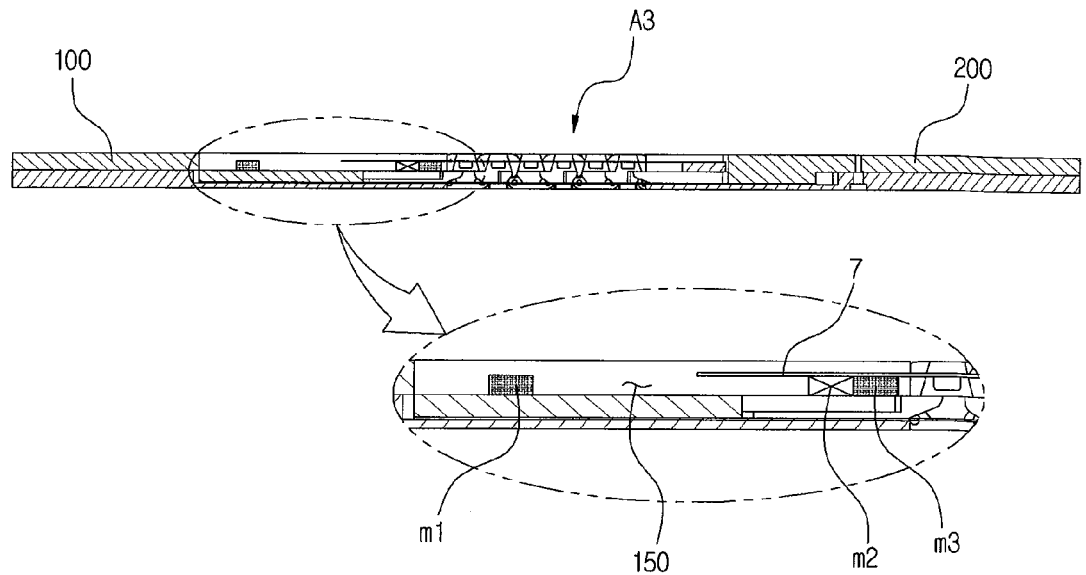
FIG. 18 is a view showing when the foldable flexible display device according to the third embodiment of the present invention is unfolded.

In the accompanying drawings, FIG. 12 is a perspective view showing when a foldable flexible display device according to a third embodiment of the present invention is unfolded, FIG. 13 is an enlarged perspective view showing a hinge member in FIG. 12, FIG. 14 is a perspective view showing the hinge member in FIG. 12, FIG. 15 is an exploded perspective view showing the hinge member in FIG. 14, FIG. 16 is a bottom perspective view showing the link assembly and the link pin in FIG. 15, FIG. 17 is a view showing when the foldable flexible display device according to the third embodiment of the present invention is folded, and FIG. 18 is a view showing when the foldable flexible display device according to the third embodiment of the present invention is unfolded.

As shown in FIGS. 12 to 18, a foldable flexible display device T3 according to the third embodiment of the present invention includes: first and second plates 100 and 200 each having a predetermined area; a hinge member A3 for connecting the first plate 100 and the second plate 200; and a flexible display screen attached to the tops of the first plate 100 and the second plate 200 and the hinge member A3.

The hinge member A3, provided for folding the first plate 100 and the second plate 200, generally guides the plates not to be angled but to be folded with smooth curvature to prevent damage to a flexible display substrate.

The hinge member A3 includes: a plurality of link assemblies 2b pivotably combined with the first plate 100 and the second plate 200 and arranged to be bendable together; and link pins 4b connecting the link assemblies 2b.

Further, the device includes a soft plate member 7 that is attached to the inner side of the hinge member A3, mounted on the inner sides of the first plate 100 and the second plate 200, and helps folding by being linked with the folding of the first plate 100 and the second plate 200 by being selectively attached, by a magnetic force, to first and second magnets m1 and m2 spaced from each other on the first plate 100.

The link assembly 2b has a first through-hole 23 at one end, which is coupled to a coupling portion 150 formed at one end of each of the first plate 100 and the second plate 200 by a shaft pin and a coupling groove 25 at the bottom in which a first coupling portion 41 of a link pin 4b is inserted.

Further, a groove 24 is formed at a side to which the link pin 4b is fitted and a second through-hole 240 to which a pin is fitted is formed at a step 26 protruding at both sides of the groove 24.

The link assembly 2b has a first inclined portion 210 at both sides on the other side which restricts excessive outward rotation when the link pin 4b is rotated outward, in close contact with the side of the link pin 4b, and has a first upper step 21 at the top which is fastened to a leaf spring 6.

The 'outward' means a direction opposite to the direction of folding and the 'excessive outward rotation' means that the first plate 100 and the second plate 200 rotate outward over the horizontally folding position.

A lower step (not shown) with a second inclined portion (not shown) at both sides, which restricts excessive inward rotation of the link pin 4b when it rotates inward, is formed on the bottom of the link assembly 2b.

The first upper step 21 and the first lower step have a substantially trapezoidal cross-section and the first inclined portion 210 and the second inclined portion 220 are formed to be opposite to each other at both sides, respectively.

The link pin 4b, which is provided for connecting two link assemblies 2b and guide them in rotation, has a first coupling portion 41 at a side which is inserted in the coupling grooves 25 of the link assemblies 2b and fixed by pins and has a protrusion 42 at both sides which is inserted in the groove 24 of the link assembly 2b.

Third through-hole (not shown) to which a pin is fitted is formed at the protrusion 42.

The link pin 4b has a second upper step 43 at a side on the top where a third inclined portion 431 being in contact with the first inclined portion 210 of the first upper step 21 of the link assembly 2b is formed, and has a second lower step (not shown) where a fourth inclined portion 442 being in contact with the first lower step 22 of the link assembly 2b is formed.

The second upper step 43 and the second lower step have a substantially trapezoidal cross-section and the third inclined portion 431 and the fourth inclined portion (not shown) are formed to be opposite to each other at both sides, respectively.

The soft plate member 7, a substantially rectangular soft plate, is rolled or unrolled with folding of the hinge member A, thereby generating the elastic force of a spring.

A third magnet m3 that is selectively attached to the first and second magnets m1 and m2 by a magnetic force is disposed at a side on the underside of the soft plate member 7.

A guide groove 72 having a predetermined length is longitudinally formed close to both sides of the soft plate member 7 and the shaft pins of the hinge member A are inserted in the guide grooves 72.

That is, the shaft pins (not shown) coupled to the link assembly 2b and the link pins 4b of the hinge member A protrude and the protruding shaft pins are inserted in the guide grooves 72.

A guide groove 105 is formed at the first plate 100 so that the third magnet m3 of the soft plate member is inserted therein and longitudinally moved.

The first magnet m1 is disposed at one end of the guide groove 105 and the second magnet m2 is disposed at the other end at a predetermined distance from the first magnet m1.

The first magnet m1 moves the end of the soft plate member 7, when the second plate 200 is folded with respect to the first plate 100, and the third magnet m3 is attached to the first magnet m1 by a magnetic force, and thus the folded status can be fixed.

When the second plate 200 is unfolded, the third magnet m3 of the soft plate member 7 is attached to the second magnet m2 by a magnetic force, and thus the folded status can be fixed.

The operation of the third embodiment T3 of the present invention having this configuration will be described hereafter.

When the flexible display device T3 according to the present invention is unfolded, the first plate 100 and the second plate 200 substantially overlap each other and the hinge member A3 is rolled.

That is, even though it is folded, the portion where the hinge member A3 is disposed has smooth curvature, and accordingly, a curved line is made such that a deformation is not caused to the flexible display screen.

Further, while the soft plate member 7 is rolled, one end of the soft plate member is moved to the first magnet m1 and the third magnet m3 is attached to the first magnet m1 by a magnetic force, and thus a closed status is fixed.

On the contrary, in unfolding, the hinge member A3 is unfolded flat, the soft plate member 7 is unfolded, the third magnet m3 is moved in the opposite direction and attached to the second magnet m2, and therefore, an unfolded status can be kept flat.

Fourth Embodiment

Figure 19:
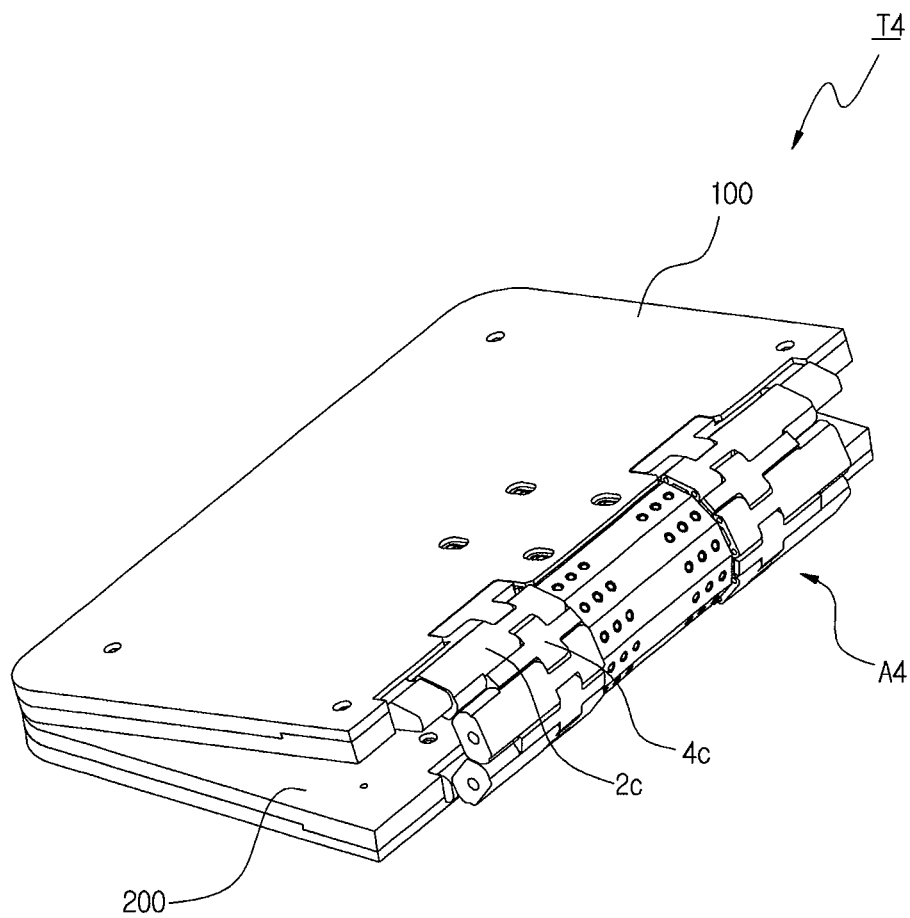
FIG. 19 is a perspective view showing when a foldable flexible display device according to a fourth embodiment of the present invention is folded.
Figure 20:
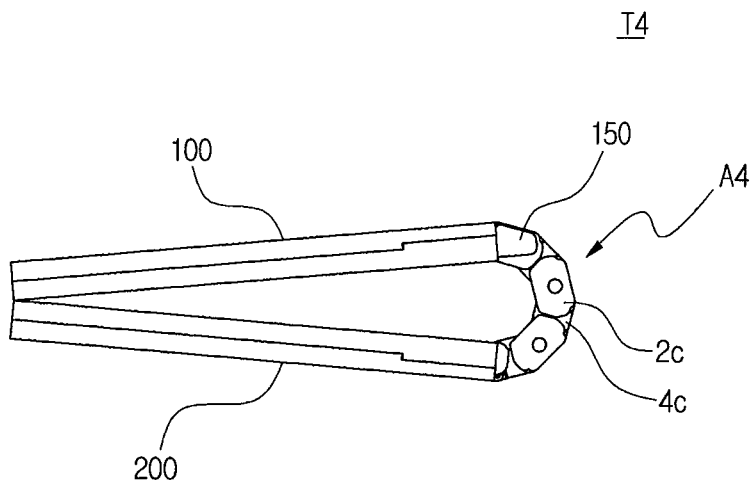
FIG. 20 is a front view showing when the foldable flexible display device according to the fourth embodiment of the present invention is folded.
Figure 21:
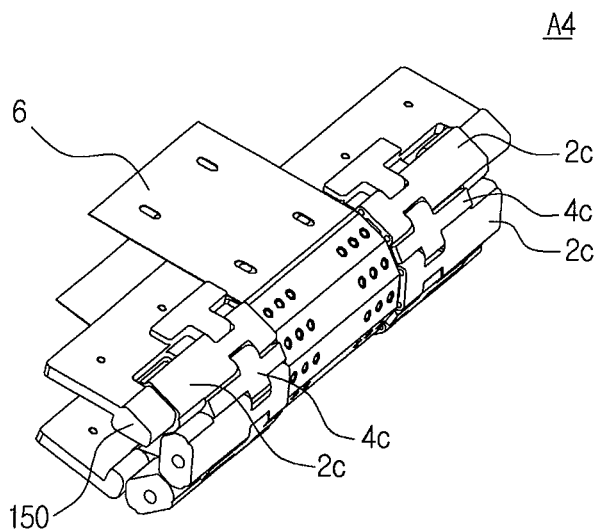
FIG. 21 is a perspective view showing a hinge member in FIG. 20.
Figure 22:
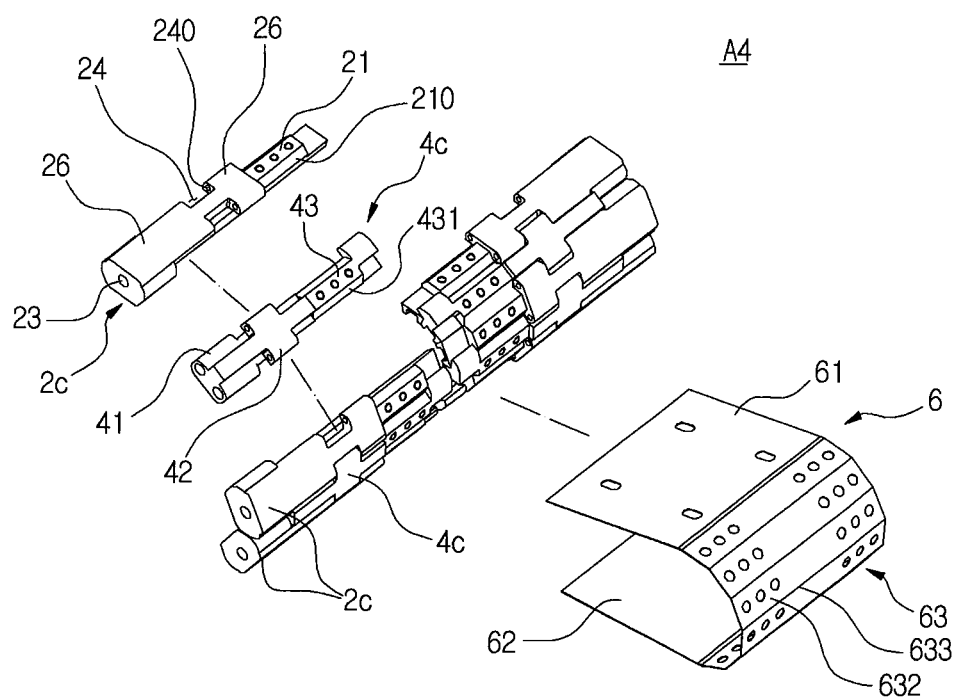
FIG. 22 is an exploded perspective view of the hinge member in FIG. 21.
Figure 23:
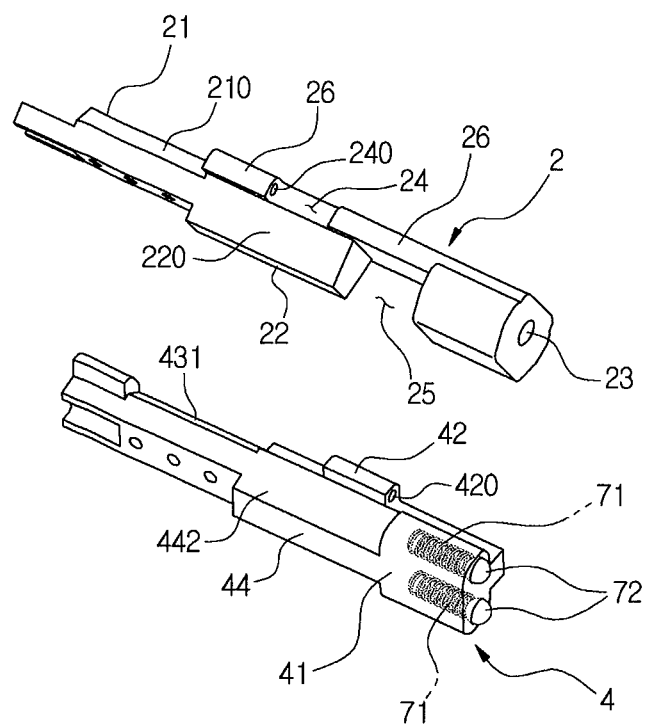
FIG. 23 is a bottom perspective view of a link assembly and a link pin in FIG. 22.
Figure 24:
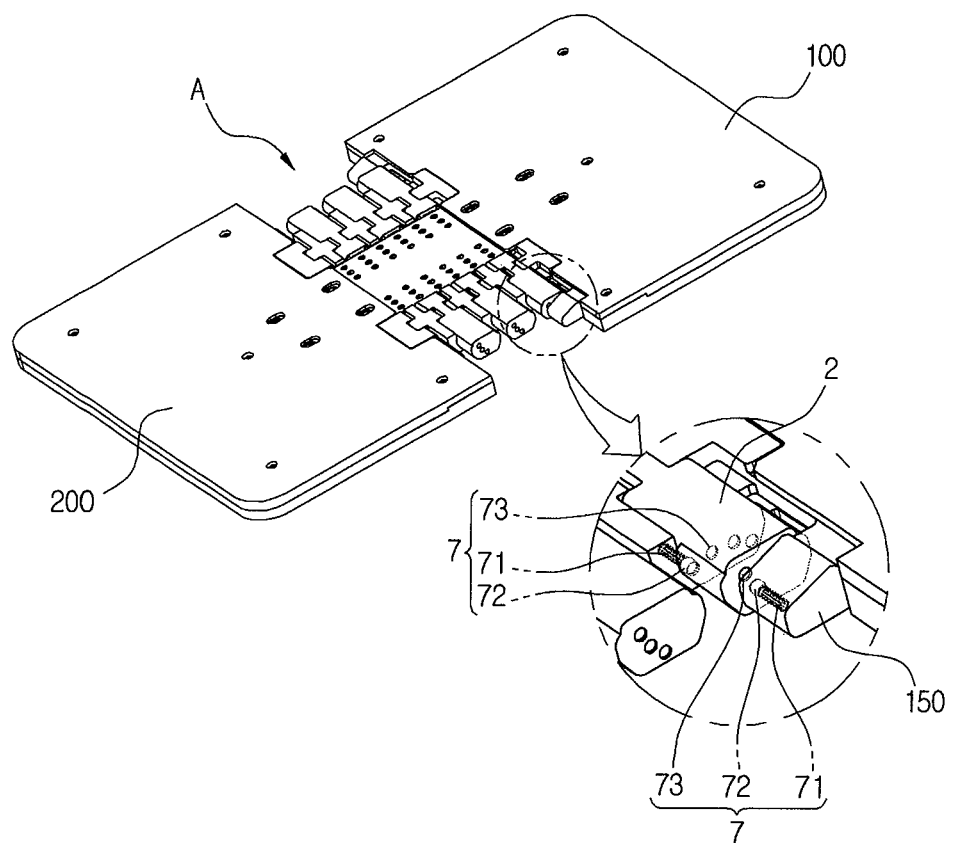
FIG. 24 is a rear perspective view of a foldable flexible display device according to the present invention, in which a fixing mechanism and a sub-fixing mechanism of a hinge member are shown.
Figure 25:
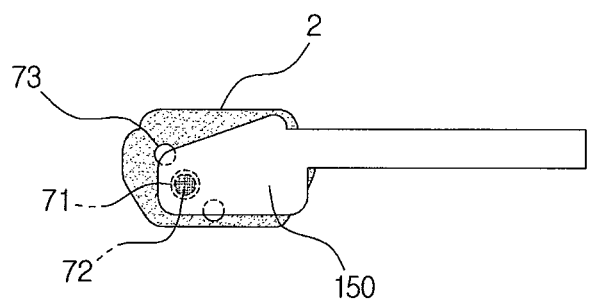
FIG. 25 is a front view showing the operation of the fixing mechanism of the hinge member in FIG. 24.
Figure 25:
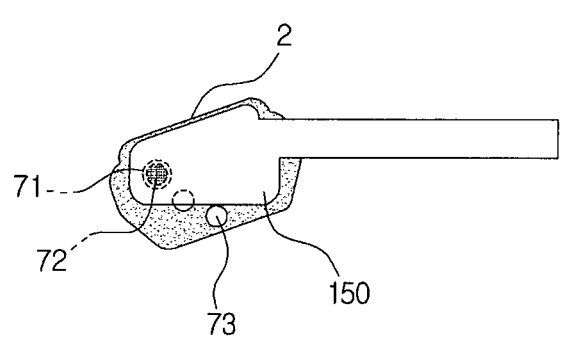

In the accompanying drawings, FIG. 19 is a perspective view showing when a foldable flexible display device according to a fourth embodiment of the present invention is folded, FIG. 20 is a front view showing when the foldable flexible display device according to the fourth embodiment of the present invention is folded, FIG. 21 is a perspective view showing a hinge member in FIG. 20, FIG. 22 is an exploded perspective view of the hinge member in FIG. 21, FIG. 23 is a bottom perspective view of a link assembly and a link pin in FIG. 22, FIG. 24 is a rear perspective view of a foldable flexible display device according to the present invention, in which a fixing mechanism and a sub-fixing mechanism of a hinge member are shown, and FIG. 25 is a front view showing the operation of the fixing mechanism of the hinge member in FIG. 24.

As shown in FIGS. 19 to 25, a foldable flexible display device T4 according to the third embodiment of the present invention includes: first and second plates 100 and 200 each having a predetermined area; a hinge member A4 for connecting the first plate 100 and the second plate 200; and a flexible display screen attached to the tops of the first plate 100 and the second plate 200 and the hinge member A4.

The hinge member A4, provided for folding the first plate 100 and the second plate 200, generally guides the plates not to be angled but to be folded with smooth curvature to prevent damage to a flexible display substrate.

The hinge member A4 includes: a plurality of link assemblies 2c pivotably combined with the first plate 100 and the second plate 200 and arranged to be bendable together; and link pins 4c connecting the link assemblies 2c.

The link assembly 2c and the link pin 4c have a fixing mechanism 7 that generates a pushing force by means of spring elasticity, on the contact surfaces.

Accordingly, the folding or unfolding angle of the link assembly 2c and the link pin 4c can be maintained by the pushing force generated by the fixing mechanism 7.

The link assembly 2c has a first through-hole 23 at one end, which is coupled to a coupling portion 150 formed at one end of each of the first plate 100 and the second plate 200 by a shaft pin and a coupling groove 25 at the bottom in which a first coupling portion 41 of a link pin 4c is inserted.

Further, a groove 24 is formed at a side to which the link pin 4c is fitted and a second through-hole 240 to which a pin is fitted is formed at a step 26 protruding at both sides of the groove 24.

The link assembly 2c has a first inclined portion 210 at both sides on the other side which restricts excessive outward rotation when the link pin 4c is rotated outward, in close contact with the side of the link pin 4c, and has a first upper step 21 at the top which is fastened to a leaf spring 6.

A first lower step 22 with a second inclined portion 220 at both sides, which restricts excessive inward rotation of the link pin 4c when it rotates inward, is formed on the bottom of the link assembly 2.

The link pin 4c, which is provided for connecting two link assemblies 2c and guide them in rotation, has a first coupling portion 41 at a side which is inserted in the coupling grooves 25 of the link assemblies 2c and fixed by pins and has a protrusion 42 at both sides which is inserted in the groove 24 of the link assembly 2c.

Third through-holes 420 to which a pin is fitted is formed at the protrusion 42.

The link pin 4c has a second upper step 43 at a side on the top where a third inclined portion 431 being in contact with the first inclined portion 210 of the first upper step 21 of the link assembly 2c is formed, and has a second lower step 44 where a fourth inclined portion 442 being in contact with the first lower step 22 of the link assembly 2c is formed.

The fixing mechanism 7 is composed of balls 72 protruded at one side of any one of the link assembly 2c and the link pin 4c by elasticity of springs 71, and a plurality of fixing grooves 73 formed one surface of any one of the link assembly 2c and the link pin 4c to correspond to the balls.

As an example, the fixing grooves 73 are formed on the inner side of a step at a side where the coupling groove 25 of the link assembly 2c is formed, and are arranged in an arc in consideration of the rotation angle, and in more detail, it is preferable that three to four fixing grooves are formed.

The balls 72 protrude from one side of the first coupling portion 41 of the link pin 4c that is inserted in the coupling groove 25 of the link assembly 2c.

Grooves (not shown) having a predetermined depth are formed in the first coupling portion 41 of the link pin 4c, the springs 71 are disposed in the grooves, and then the balls 72 are inserted, in which, preferably, the balls 72 are partially exposed through the openings of the grooves.

Preferably, the opening of the groove is formed to be a little smaller than the diameter of the ball 72 and thus substantially one-third of the ball 72 is exposed to the outside.

As the exposed balls 72 are selectively inserted or separated into/from the fixing grooves 73, fixing and detaching can be performed, angle can be adjusted by those operations, and the link assemblies 2c and the link pins 4c can be kept under predetermined tensile force by predetermined tension.

A fixing mechanism 7 is disposed on the contact surface too of the link assembly 2c and the coupling portion 150 formed at one end of the first plate 100.

That is, since the balls 72 protruded by the elasticity of the springs 71 are formed on one side of the coupling portion 150 and the fixing grooves 73 are formed on one side of the link assembly 2c to correspond to the balls, and thus the angle can be adjusted, as described above.

A first leaf spring 6, which surrounds the outer side of the hinge member A4, with one end connected to the first plate 100 and the other end connected to the second plate 200, is provided.

The first leaf spring 6 has first and second plate portions 61 and 62 connected with the first plate 100 and the second plate 200, respectively, and a curved portion 63 connected to the first and second plate portions 61 and 62 and mounted on the outer side of the hinge member A4.

The curved portion 63 is formed by connecting a plurality of mounting surfaces 632 mounted on the link assembly 2c and the link pin 4c of the hinge member A4, respectively, and each of which has a folding portion 633 for easy bending.

The curved portion 63 is mounted and fixed, for example, by welding or bolting the mounting surfaces 632 to the first upper step 21 of the link assembly 2c and the second upper step 43 of the link pin 4c which correspond to the mounting surfaces, respectively.

The operation of the fourth embodiment T4 of the present invention having this configuration will be described hereafter.

Therefore, as shown in FIG. 16, when the flexible display device T4 according to the present invention is folded, the hinge member A4 is rolled.

That is, even though it is folded, the portion where the hinge member A4 is disposed has smooth curvature, and accordingly, a curved line is made such that a deformation is not caused to the flexible display screen. Further, when stress is generated while the first leaf spring 6 is bent and a force that closes the first plate 100 and the second plate 200 is removed, the plates can be naturally unfolded by a restoring force of the leaf spring 6.

On the other hand, as shown in FIG. 21, when the flexible display device T4 according to the present invention is unfolded, the hinge member A4 is unfolded flat and the leaf spring 6 is fixed to the link assemblies 2c and the link pins 4c; therefore, predetermined linked motion is provided and the unfolded status can be kept flat.

According to the present invention, the operation for folding or unfolding the screen of a flexible display device can be smoothly operated and damage to the display screen can be prevented, resulting in remarkable improvement in reliability of a product.

Although the present invention was described above with reference to the exemplary embodiments stated above, those skilled in the art can easily recognize that the present invention may be changed and modified in various ways without departing from the spirit and scope of the present invention and it is apparent that the changes and modifications are all included in claims.

What is claimed is:

1. A foldable flexible display device comprising:
   first and second plates each having a predetermined area; and
   a hinge member for connecting the first plate and the second plate;
   wherein the hinge member has a curvature on folding of the first plate and the second plate together,
   wherein the hinge member comprises:
   a plurality of link assemblies pivotably coupled to the first plate and the second plate and arranged to be bendable together;
   link pins connecting the plurality of link assemblies to one another; and
   an elastic leaf spring that surrounds an outer side of the hinge member, the leaf spring having one end connected to the first plate and another end connected to the second plate,
   wherein at least some of the plurality of the link assemblies each have:
   a first through-hole coupling to a coupling portion formed at one end of a respective one of the first plate and the second plate;
   a coupling groove and a link-pin groove in which portions of adjacent link pins are inserted;
   a second through-hole to which a pivot pin is fitted, the second through hole being formed in protrusions on opposite sides of the link-pin groove; and
   an upper step that has an inclined portion in close contact with a side of one of the respective adjacent link pins, the upper step serving to restrict excessive outward or opening rotation of the first plate and the second plate relative to one another.

2. The device of claim 1, wherein the first leaf spring comprises:
   first and second plate portions connected with the first plate and the second plate, respectively; and
   a curved portion connected to the first and second plate portions and mounted on the outer side of the hinge member.

3. The device of claim 2, wherein the curved portion is formed by connecting a plurality of mounting surfaces mounted on the plurality of link assemblies and the link pins of the hinge member, respectively, and each of the mounting surfaces has a folding portion formed in the width direction for easy bending.

4. The device of claim 1, wherein each of the plurality of link assemblies is formed on a bottom side with a lower step having an inclined portion, which restricts excessive inward rotation of the first plate and the second plate towards a closure configuration when the link pin rotates inward.

5. The device of claim 4, wherein each of the link pins has:
   a pair of oppositely extending protrusions that are inserted in the link-pin grooves of adjacent ones of the link assemblies, each of the oppositely extending protrusions having a third through-hole for receiving a respective pivot pin fitted to the second through-hole of one of the plurality of link assemblies;
   an additional upper step that has an inclined portion in contact with the inclined portion of the upper step of an adjacent one of the link assemblies, the additional upper step being formed at a top side of the respective link pin; and an additional lower step that has an inclined portion in contact with the lower step of the adjacent one of the link assemblies.

* * * * *